US008331262B2

(12) United States Patent
Hu et al.

(10) Patent No.: US 8,331,262 B2
(45) Date of Patent: Dec. 11, 2012

(54) APPARATUS AND METHOD FOR SETUP OF OPTIMUM ROUTE USING TREE-TOPOLOGY

(75) Inventors: Xu-hui Hu, New York, NY (US); Yong Liu, New York, NY (US); Chun-hui Zhu, New York, NY (US); Myung-jong Lee, New York, NY (US)

(73) Assignees: Samsung Electronics Co., Ltd., Suwon-Si (KR); City University of New York, New York, NY (US)

( * ) Notice: Subject to any disclaimer, the term of this patent is extended or adjusted under 35 U.S.C. 154(b) by 2555 days.

(21) Appl. No.: 10/841,477

(22) Filed: May 10, 2004

(65) Prior Publication Data
US 2004/0233882 A1 Nov. 25, 2004

Related U.S. Application Data

(60) Provisional application No. 60/469,015, filed on May 9, 2003.

(30) Foreign Application Priority Data

Apr. 3, 2004 (KR) .................. 10-2004-0023158

(51) Int. Cl.
*H04L 12/28* (2006.01)
*G06F 15/173* (2006.01)

(52) U.S. Cl. ........ 370/254; 370/255; 370/256; 370/390; 709/223; 709/226

(58) Field of Classification Search .......... 370/254–256, 370/390; 709/223–224
See application file for complete search history.

(56) References Cited

U.S. PATENT DOCUMENTS

| 6,535,498 | B1* | 3/2003 | Larsson et al. | 370/338 |
| 6,704,293 | B1* | 3/2004 | Larsson et al. | 370/255 |
| 6,751,200 | B1* | 6/2004 | Larsson et al. | 370/255 |
| 2003/0204623 | A1* | 10/2003 | Cain | 709/241 |
| 2004/0022224 | A1* | 2/2004 | Billhartz | 370/338 |
| 2004/0218548 | A1* | 11/2004 | Kennedy et al. | 370/254 |
| 2005/0036486 | A1* | 2/2005 | Sahinoglu et al. | 370/389 |

(Continued)

FOREIGN PATENT DOCUMENTS

JP  2003-516031  5/2003

OTHER PUBLICATIONS

SAN: Route Discovery and Maintenance, Enes Makalic, 2001.*

(Continued)

*Primary Examiner* — Hassan Phillips
*Assistant Examiner* — Hicham Foud
(74) *Attorney, Agent, or Firm* — Sughrue Mion, PLLC

(57) ABSTRACT

A method for relaying a route request RREQ message by an intermediate node which is connected with at least one node using a tree topology in a mobile communication system including a destination node and a source node which sends the RREQ message to the destination node via at least one intermediate node, to thus establish an optimal route for communications. The RREQ message is received along the route other than the tree route, and the first information is updated using its information. The intermediate node relays to a next intermediate node the RREQ message containing the updated first information.

31 Claims, 11 Drawing Sheets

U.S. PATENT DOCUMENTS

2005/0129000 A1*  6/2005  Sivakumar et al. ............ 370/351
2005/0249155 A1* 11/2005  Seo et al. ...................... 370/328

OTHER PUBLICATIONS

Chinese Office Action for Chinese Patent Application No. 20041007668.8 Feb. 9, 2007.

Yu-Chee Tseng, et al., *Fully Power-Aware and Location-Aware Protocols for Wireless Multi-hop Ad Hoc Networks*, Computer Communications and Networks, 2002. Proceedings, Eleventh International Conference on Oct. 14-16, 2002, Piscataway New Jersey, USA, IEEE, pp. 608-613, XP010610947, ISBN:0-7803-7553-X (p. 610, right-hand column, line 15-line 41).

Charles E. Perkins, et al., *Ad Hoc On-Demand Distance Vector (AODV) Routing*, draft-ietf-manet-aodv-08.txt, Mobile Ad Hoc Networking Working Group, Internet Draft, Annual Workshop on Mobile Ad Hoc Networking and Computing, MOBIHOC, Mar. 2, 2001, pp. 1-27, XP002232330 (p. 9, line 22-p. 11, line 5, p. 19, line 24-line 28, figure 2, p. 7, line 20-line 21).

Prasun Sinha, et al., *Scalable Unidirectional Routing with Zone Routing Protocol (ZRP) Extensions for Mobile Ad-Hoc Networks*, Wireless Communications and Networking Conference, 2000, IEEE Sep. 23-28, 2000, Piscataway, New Jersey, USA, IEEE, vol. 3, 23, pp. 1329-1339, XP010532740 ISBN: 07-803-6596-8 (p. 1331, right-hand column, line 47-p. 1332, left-hand column, line 46).

Japanese Office Communication dated Nov. 17, 2009 issued in counterpart application No. 2006-324997.

* cited by examiner

——— : TREE ROUTE
● : N+
○ : N−
——→ : RREQ
------→ : RREP

US 8,331,262 B2

APPARATUS AND METHOD FOR SETUP OF OPTIMUM ROUTE USING TREE-TOPOLOGY

CROSS-REFERENCE TO RELATED APPLICATIONS

This application claims the benefit of U.S. Provisional Application No. 60/469,015, filed May 9, 2003, in the United States Patent and Trademark Office and Korean Patent Application No. 2004-23158 filed Apr. 3, 2004, the disclosures of which are incorporated herein by reference in their entirety.

BACKGROUND OF THE INVENTION

1. Field of the Invention

The present invention relates generally to a wireless personal area network (WPAN), and more particularly, to an apparatus and a method of establishing a route from a source node to a destination node in the WPAN based on a tree topology.

2. Description of the Related Art

In general, data is transmitted and received between a mobile element and a base station in a mobile communication system. That is, the mobile element and the base station directly transmit and receive data without passing along other nodes. In contrast, a wireless personal area network (WPAN) has been developed to interconnect devices within a very short range. The WPAN is an ad-hoc data communication system enabling multiple nodes to communicate with each other. A transmitting node included in the ad-hoc network transmits data to a receiving node via other nodes. If the receiving node is adjacent to the transmitting node, data can be directly transmitted between the nodes. Referring now to FIG. 1, data transmission is described according a conventional routing algorithm in relation to nodes configuring an ad-hoc network based on a tree topology.

The ad-hoc network of FIG. 1 includes at least two nodes. The nodes are classified into two categories. One category includes a node maintaining a routing table and referred to as "N+". The other category includes a node without a routing table and referred to as "N−".

A conventional method for building a route in the ad-hoc network including N+ and N− will be described below. Let a node A be a source node, and a node I be a destination node. The source node requests a route setup from the destination node. Thus, the node A, which is N+, checks whether its routing table contains a route information with respect to the destination node I. If not, the node A broadcasts a route request RREQ message to neighbor nodes to set a route to the node I at step S100. The node B, which is N+, looks up a route information on the destination node I of the received RREQ message in its routing table. If storing the route information, the node B replies with a route reply RREP message. If not storing the route information, node B creates a route information field into its routing table and broadcasts the RREQ message to neighbor nodes at steps S102 and S108. The node C, which is N+, also performs the same operations as the node B at steps S104 and S106.

Upon receiving the RREQ message broadcast from the node B, the node G, which is the N−, transmits a RREP message to the node B in reply to the RREQ message at step S128. According to the conventional algorithm, the N− in the ad-hoc network transmits the RREP message in reply to the RREQ message. The N−, although itself is not the destination node requested in the received RREQ message, transmits the RREP message according to the tree topology and its node characteristic. That is, since the N− does not have its routing table, the N− cannot store or look up the route information even after receiving the RREQ message, and since the tree topology only allows message transmission to an upstream node or a downstream node, further route search is not feasible. The RREP message from the node G is forwarded to the node A via the node B at step S120. In general, each node stores in its neighbor list information on nodes within a certain distance, such as, for example, 1 hop, at the creation phase of the tree topology.

The node D, which is the N−, performs the same operations as the node G. Hence, a RREP message generated by the node D is forwarded to the node A via the nodes C and B at steps S124, S122, and S120. Upon receiving the RREQ message from the node C, the node F, which is the N+, can broadcast the RREQ message at steps S110, S112 and S114. The node E performs the same operations as the node G. The node H forwards the received RREQ message to the node I at step S116. Upon receiving the RREQ message, the node I recognizes that a node for which the route is requested by the node A, is itself. Accordingly, the node I generates a RREP message in reply to the RREQ message. The RREP message is forwarded to the node A along the route of the RREQ message. As a result, the route is established between the node A and node I. Albeit not described, a N+ having the routing table creates a field on the destination node into its routing table by use of the received RREQ message information and transmits the received RREQ message to neighbor nodes. In general, the N+ updates and forwards a hop count to the neighbor nodes. A route having the smallest hop count is selected to be a route between the nodes. Afterwards, Ns+ receive the RREP message in reply to the RREQ message and manage their routing tables by filling field values of the routing tables which are created for the related nodes. In light of the foregoing, the node A receives multiple RREP messages in reply to the single RREQ message. Meanwhile, the RREP messages from the Ns− are not necessary.

FIG. 2 illustrates another exemplary process for setting a route using nodes in the ad-hoc network based on the conventional algorithm, in which the forward route from the source node to the destination node can be established differently from the backward route from the destination node to the source node.

The node A requests to set up a route to the node E. The node A determines whether a route to the node E is established by looking up a stored routing table. As it is determined that there is no route to the node E, the node A broadcasts a RREQ message at step S200. Upon receiving the RREQ message, the node B also looks up a stored routing table and determines whether a route to the node E is set. As it is determined that there is no route to the node E, the node B broadcasts the RREQ message at step S202.

The node C determines whether itself is a node for which a route is requested by the node A. Since the node C is not the node for the route requested by the node A, the node C, which is the N−, transmits the RREQ message to the node D along a tree route at step S204. The node D also determines whether itself is a node for which a route is requested by the node A. Since the node D is not the node for the route requested by the node A, the node D transmits the RREQ message to the node E at step S206. The node E recognizes that itself is the node for the route requested by the node A.

The node E generates a RREP message in reply to the RREQ message. The generated RREP message is transmitted to the node D at step S210. The node D transmits the received RREP message to the node F at step S212. The node F forwards the RREP message to the source node A along the tree route. As a result, the forward route differs from the backward route, and a solution to this problem is required.

SUMMARY OF THE INVENTION

To address the above shortcomings of the related art, an aspect of the present invention is to provide an apparatus and a method capable of establishing an optimum route in a wireless network including a tree topology and nodes which have limited functions (for example, N− having no On-demand routing setup function due to the absence of its own routing table).

Another aspect of the present invention is to provide an apparatus and a method capable of preventing the reception of multiple RREP messages in reply to an RREQ message.

Still another aspect of the present invention is to provide an apparatus and a method capable of establishing a backward route that is the same as a forward route.

Yet another aspect of the present invention is to provide an apparatus and a method for setting up an optimum route to a destination node with a smallest link cost, generally, with the smallest hop count.

To achieve the above and other aspects of the present invention, a method for relaying a route request RREQ message by an intermediate node which is connected with at least one node in a mobile communication system of a tree topology including a destination node and a source node which sends the RREQ message to the destination node via at least one intermediate node, includes determining whether to use a route method or to use a table-driven scheme of on-demand system according to a location of a destination node to thus search and establish a route, updating a first information for searching a backward route using its stored information when the RREQ message is received along a route other than the tree route, and transmitting the RREQ message containing the updated first information.

In addition, an apparatus for establishing a route from a source node to a destination node in a mobile communication system of a tree topology including the destination node and the source node which sends the RREQ message to the destination node via at least one intermediate node, includes the source node for determining a route setup method of using pre-established tree routes or searching a new route by broadcasting RREQ messages following the on-demand according to the location of the destination node, for creating a route request RREQ message according to the determination, and transmitting the created RREQ message, at least one intermediate node for transmitting the RREQ message of which a first information updated using its information when the RREQ message is received along the route other than the tree route, and the destination node.

BRIEF DESCRIPTION OF THE DRAWING FIGURES

These and/or other aspects and advantages of the invention will become apparent and more readily appreciated from the following description of the embodiments, taken in conjunction with the accompanying drawing figures in which.

DETAILED DESCRIPTION OF THE EMBODIMENTS

Figure 1:
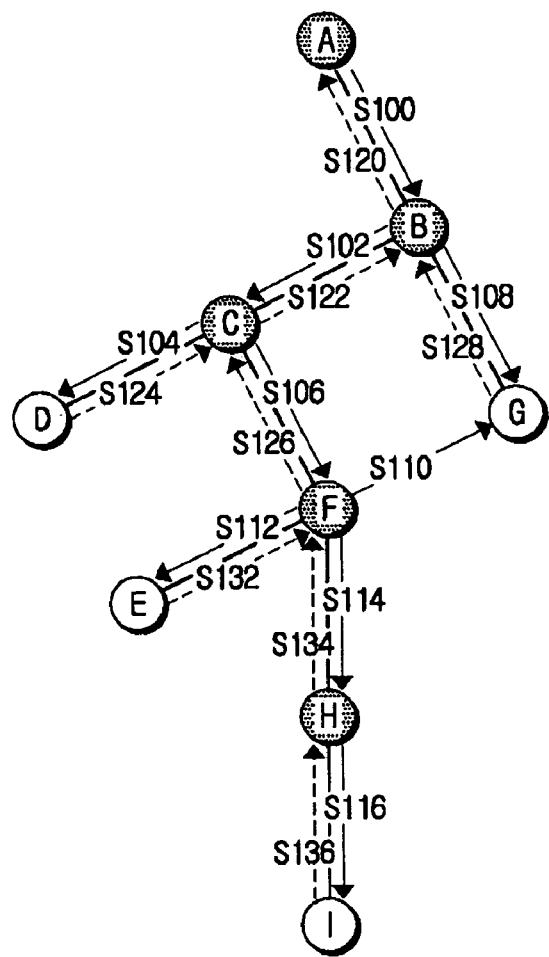
FIG. 1 is a diagram illustrating one example of conventional routing in an ad-hoc network based on a tree topology.
Figure 2:
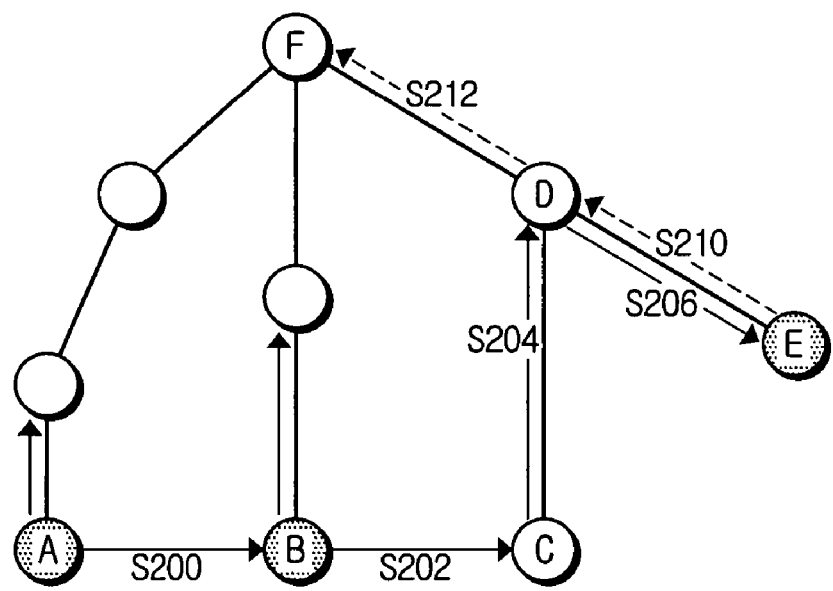
FIG. 2 is a diagram illustrating another example of conventional routing in an ad-hoc network based on a tree topology.

Reference will now be made in detail to exemplary embodiments of the present invention, which are illustrated in the accompanying drawing figures, wherein like reference numerals refer to the like elements throughout. The exemplary embodiments are described below in order to explain the present invention by referring to the drawing figures.

Prior to the detailed description, definitions of various terms are described. A tree route indicates a pre-established route between nodes before establishing a route by use of RREQ and RREP messages according the on-demand scheme. A route is established using intermediate nodes for communications between a source node and a destination node. A descendent node is a node that is further down the tree structure from a related node, that is, having a greater depth. An ancestor node is a node that is further up the tree structure from its related descendent node, that is, having a less depth. A parent node is an ancestor node of a related node, which follows upward the tree structure. A child is a descendent node of a related node, which follows downward the tree structure.

According to an embodiment of the present invention, a source node determines a routing method based on its type (N+ or N−) and a location of a destination node. An optimum route uses pre-established tree routes to transmit data packets if the destination node is an ancestor node within the same cluster as the source node, a descendent node, or the cluster of the destination node has a greater depth than that of the source node. Otherwise, an optimum route is using the on-demand scheme by broadcasting the RREQ message as compared with using the route routes. Hereinafter, a routing method is described when data created in an application program of a source node is transmitted to a destination node.

Referring back to FIG. 1, if the node F is a source node and the node A is a destination node, descendents of the node F are the nodes E, H, and I and ancestors of the node F are the nodes C, B, and A. The source node F can spot relative locations of the destination node and the source node in the tree structure by analyzing an address of the destination node A. That is, the source node F spots that the destination node A is its ancestor node.

With recognizing the node A is the ancestor following the tree route through the tree router calculations, the node F transmits data packets to the node A. The node F may store into its routing table information on the node A being the ancestor node following the tree route. If the information is stored into the routing table, the node F transmits data packets to the node F using the information in the routing table without the tree router calculations. Accordingly, it takes less time for the node F to spot the location of the node A through the tree router calculations.

Alternatively, the node F may attach certain information to the transmitted data. The certain information indicates to relay data to a parent node along the tree route when the address of the destination node attached to the data is not the same as that of the data-received node. Hence, the node C relays the data to the node B without spotting the location by use of address of the node A. The node B also relays the received data to the node A.

As the source node transmits data to the destination node which is its ancestor node in the tree structure only by analyzing the address of the destination node and spotting the relative location of the destination node without having to establish the route, the route setup time is reduced. As a result, the total time for the data transmission is diminished. The source node can transmit data packets to the destination node through the tree router calculation only one time.

First Exemplary Embodiment

According to a first embodiment of the present invention, a source node establishes a route to a destination node. Initially, a case with a N− along the tree route is described, and another case with a N+ along the tree route follows.

1. N− in the tree

If the N− is a source node, N− source node determines whether a destination node is its descendent node or ancestor node along the tree route. Although not storing a routing table, the N− can determine whether the destination node is its descendent node or ancestor node by analyzing the address of the destination node, to thus transmit data packets using the connected tree route according to the determination. The N− source node searches a route by use of Ns+ located along the route to the destination node as its agent nodes.

If the N− is an intermediate node, the N− intermediate node relays the received data to its parent node or child node following the tree route by analyzing the address of the destination node. When receiving a RREQ message, the N− operates according to the transmission type (broadcast or unicast) of the received RREQ message. That is, upon receiving the broadcast RREQ message, the N− spots the relative location of the node transmitted the RREQ message and transmits (unicasts) the received RREQ message using its tree route only when the RREQ message is received from its child node and the final destination node of the RREQ message is its descendent node. Other broadcast RREQ messages are discarded. Thus, unnecessary RREQ messages are not transmitted and received. Upon receiving the unicast RREQ message, the N− intermediate node transmits (unicasts) the received RREQ message along the suitable tree route depending on the relative location of the destination node. A method for the N− to determine whether the received RREQ message is a broadcast message or a unicast message is described below. A node, which transmits a RREQ message generally, determines whether to broadcast or unicast the RREQ message. If determining to unicast, the node sends the RREQ message after adding into a destination address field of the RREQ message an address of the node to receive the RREQ message. Upon determining to broadcast, the node sends the RREQ message after adding into the destination address field of the RREQ message a broadcast address information which is set at the early stage of system design. Upon receiving the RREQ message, the reception node can know whether the RREQ message is broadcast or unicast to itself by comparing the destination address field and its own address information.

A case when the N− is a destination node is now described. Upon receiving a RREQ message broadcast by a descendent node which is located between the source node of the RREQ message and the destination node in the tree structure, the N− creates a RREP message and transmits the RREP message using the route information contained in the received RREQ message. Upon receiving a unicast RREQ message, the N− creates and transmits a RREP message.

2. N+ in the tree

If data created in the application program of a N+ certain node is to be transmitted to a certain destination node or the N+ node becomes a source node upon receiving data packets from neighbor nodes, the N+ having its own routing table looks up the destination information in the routing table. If so, the N+ transmits the data packets to a next hop address stored in the routing table. If not, the source node spots the relative location of the destination node by analyzing the address information of the destination node. If the destination node is a neighbor node or a descendent node of the source node, the source node transmits the data packets along the related tree route. Otherwise, the source searches a route through the RREQ message broadcast to thus establish a new route. The transmission of the received data packets may be deferred until the search is ended. According to the search results, the source node selects a RREP message having the smallest link cost (in general, a hop count) amongst the received RREP messages, stores the related information in the routing table, and transmits the data packets along the related route.

When the N+ is an intermediate node and receives data packets, the N+ operates the same as the source node. If receiving the RREQ message, the N+ looks up a related information in the routing table. If storing the related information, the N+ replies with a RREP message, and if not storing the related information, the N+ analyzes addresses. If the destination node is its descendent node, the N+ transmits the received data to the destination node using a related tree route. If the destination node is not its descendent node, the N+ broadcasts the received RREQ message to neighbor nodes.

Figure 3:
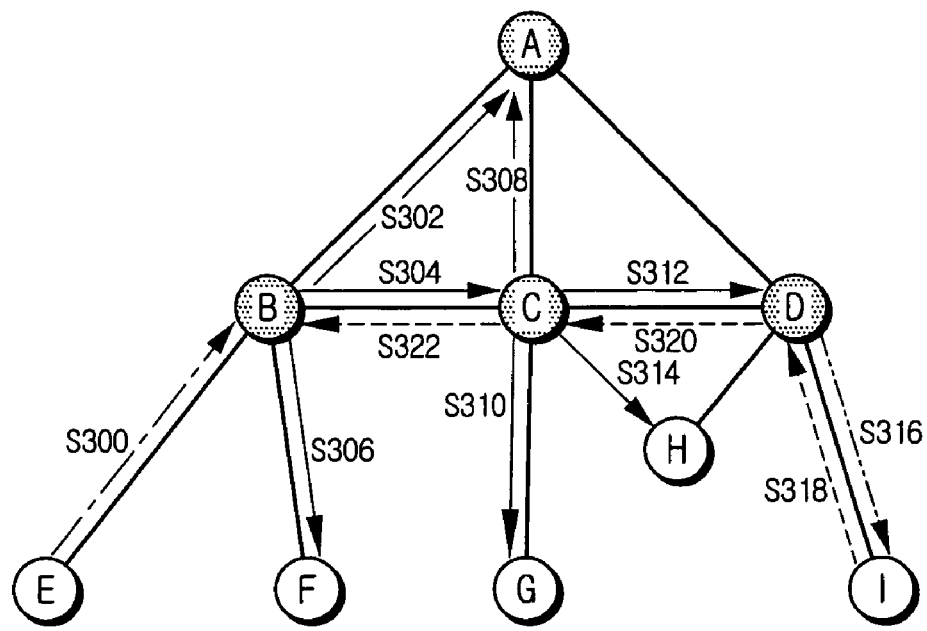
FIG. 3 is a diagram illustrating a tree routing according to one embodiment of the present invention.

If the N+ is the destination node, the N+ looks up in its routing table and determines whether a RREQ message is received from a related source node. If initially receiving a RREQ message, the N+ records an information on the related source node in the routing table and replies with a RREP message. If receiving an overlapping RREQ message, the N+ compares a pre-stored link cost value with a link cost value of the received RREQ message. When the received RREQ message has a smaller value, the N+ updates the routing table information and replies with a RREP message. Referring now to FIG. 3, the present invention is described mainly with reference to an exemplary embodiment.

A source node is the node E and a destination node is the node I. The source node E, which is the N− having no routing table, sends data to the parent node B following the tree route at step S300. The source node E, which is a terminal node in the tree structure, has one tree branch to its parent node. Accordingly, the source node E transmits data packets using the parent node B as an agent node without having to analyze the destination address. The node B, which is the N+, extracts address information of the destination node from the received data, and looks up a route information on the destination node in its routing table. If not storing the information, the node B analyzes the location of the destination node using the extracted address information. Since the destination node I of FIG. 3 is not a descendent node of the node B, the node B stores the received data and creates and broadcasts a RREQ message at steps S302, S304, and S306. The node F discards the received RREQ message since the received RREQ message is the broadcast message from the ancestor node along the tree route.

The N+ node C updates a destination information of its routing table using the information in the received RREQ message and broadcasts the received RREQ message at steps S308, S310, S312, and S314. The nodes G and H discard the received RREQ message. The node A, which receives the RREQ message from both of the nodes B and C, can acquire the location of the destination node I if the node A maintains the routing table on the destination node I. The node A transmits the RREP message in reply to the received RREQ message. At this time, the node A compares a hop count of the received RREQ message and transmits the RREP message only for the RREQ message having the smallest hop count. Still referring to FIG. 3, the node A transmits the RREP message to the node B alone. If not maintaining the routing table on the destination node I, the node A unicasts the RREQ message to the node D since the node A knows that the destination node is not its descendent node. The detailed description of the RREQ message transmitted from the node A is omitted for conciseness.

The node D unicasts the updated RREQ message to the destination node I at step S316. The destination node I creates a RREP message in reply to the RREQ message and unicasts the created RREQ message to the node D at step S318. The node D transmits the updated RREP message to the node C using the information stored in the routing table as receiving the RREQ message at step S320, and the node C transmits the updated RREP message to the node B in the same manner at step S322. As a result, the route is established for transmitting data from the node B to the destination node I. The node B transmits the stored data to the destination node I following the established route.

Figure 4:
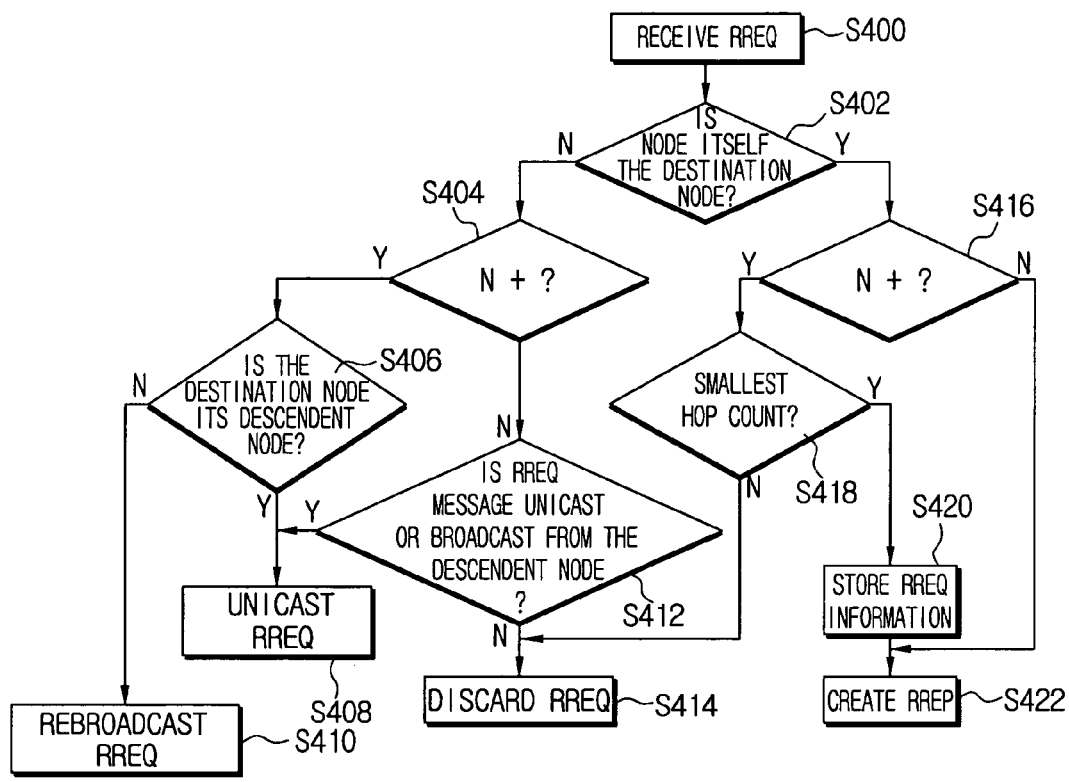
FIG. 4 is a flowchart illustrating exemplary steps of a RREQ-received node according to one embodiment of the present invention.

FIG. 4 illustrates exemplary steps of the RREQ-received node according to one embodiment of the present invention. A node receives the RREQ message at step S400. The node determines whether itself is a destination node using the received message at step S402. If the node is the destination node, the node determines whether itself is a N+ node at step S416. If the node is not the destination node, the node determines whether itself is a N+ at step S404.

If the node is an N+ at step S404, the node determines whether the destination node of the RREQ message is its descendent node at step S406. If the destination node is not the descendent node, the node updates and rebroadcasts the received RREQ message at step S410. If the destination node is the descendent node, the node updates and unicasts the received RREQ message at step S408. Meanwhile, if the node is not an N+, the node determines whether the received RREQ message is unicast or broadcast from the descendent node at step S412. If so, the node updates and unicasts the received RREQ message at step S408. If not, the node discards the received RREQ message at step S414.

If the node is an N+ at step S416, the node compares a link cost of the received RREQ message and the link cost stored in the routing table at step S418. If the received RREQ message has a smaller link cost, the node updates the information on the received RREQ message in the routing table at step S420. If the link cost of the received RREQ message is not smaller, the node discards the received RREQ message at steps S414. The node creates a RREP message in reply to the received RREQ message at step S422.

Figure 5:
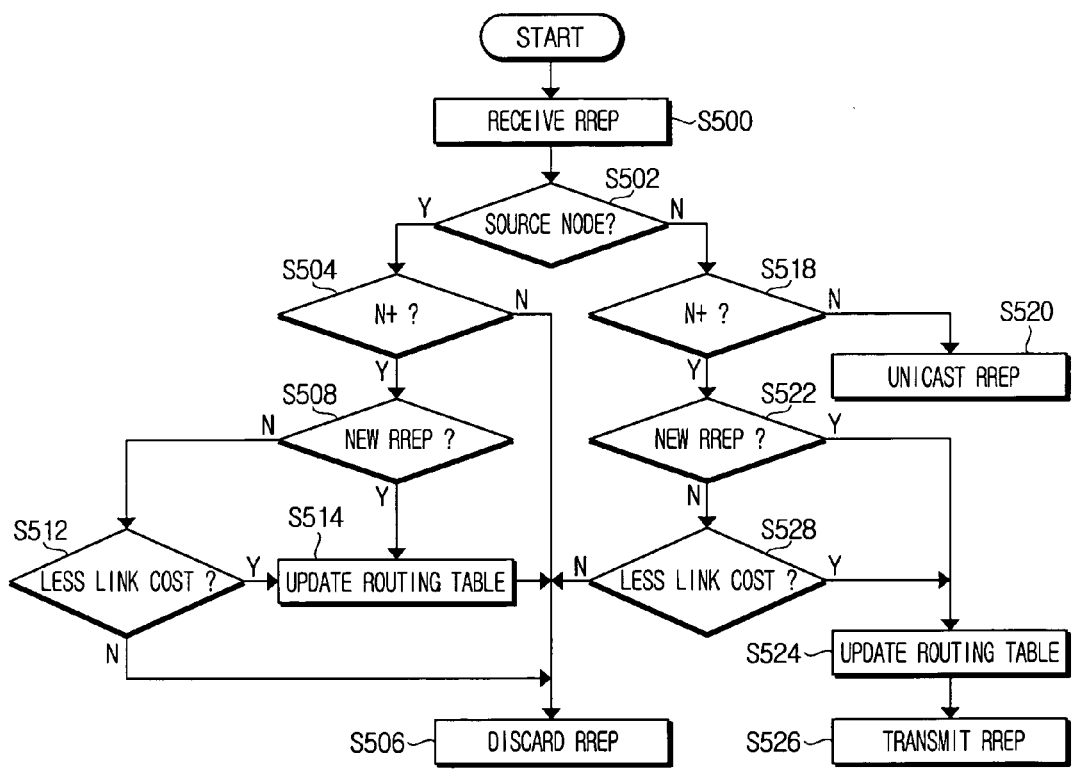
FIG. 5 is a flowchart illustrating exemplary steps of a RREP-received node according to one embodiment of the present invention.

FIG. 5 is a flowchart illustrating exemplary steps of a RREP-received node according to one embodiment of the present invention. A node receives a RREP message at step S500. The node determines whether itself is a source node at step S502. If so, the node determines whether itself is a N+ at step S504. If the node is not an N+, the node discards the RREP message at step S506. If the node is an N+, the node determines whether the received RREP message is a new one at step S508. If so, the node creates a new routing table information on the related source node and updates the routing table at step S514. If not, that is, if the RREP message has been received, the node compares the link cost of the RREP message with that of the routing table at step S512. If the link cost of the received RREP message is smaller than the stored link cost, the node updates the routing table with the related information at step S514 and discards the RREP message at step S506.

If the node is not the source node at step S502, the node determines whether itself is a N+ at step S518. If the node is not an N+, the node unicasts the RREP message at step S520. If the node is N+, the node determines whether the received RREP message is a new one at step S522. If so, the node creates a routing table on the related node and updates the routing table at step S524 and transmits the RREP message at step S526. If not, that is, if the node maintains the related information in the routing table, the node compares the link cost of the RREP message with that of the related information at step S528. If the RREP message has a smaller link cost, the node updates the routing table information on the related source node at step S524 and transmits the RREP message at step S526. If the RREQ message does not have a smaller link cost, the node discards the RREP message at step S506.

Figure 6:
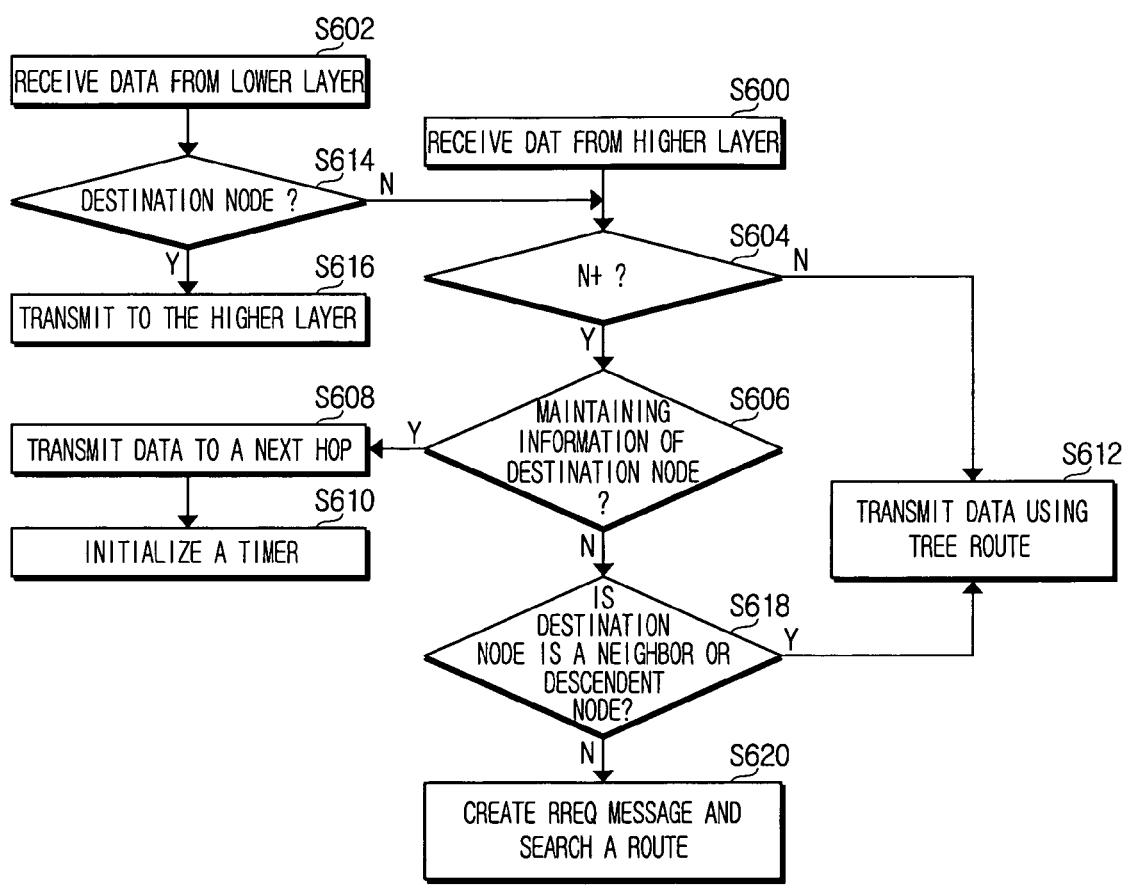
FIG. 6 is a flowchart illustrating exemplary steps of a data-received node according to one embodiment of the present invention.

FIG. 6 is a flowchart illustrating exemplary steps of a data-received node according to one embodiment of the present invention. The step S600 is a case when a node receives data from an application program (higher layer) and the step S602 is a case when a node receives data from a neighbor node (lower layer). If the node receives data at step S602, the node determines whether itself is a destination node at step S614. If so, the node transmits the data to the higher layer at step S616. If not, the node determines whether itself is a N+ at step S604. If so, the node determines whether its routing table stores the destination information at step S606. If so, the node transmits the data to a next hop node at step S608 and initializes a timer at step S610. If not storing the destination information, the node spots a relative location of the destination node at step S618. If the destination node is its descendent node or a neighbor node which can be spotted, the node transmits the data along a related tree route at step S612. If not, the node creates and broadcasts a RREQ message to search a route at step S620. If the node is not an N+ at step S604, the node transmits the data along the tree route at step S612.

Limitations of one embodiment are illustrated below with reference to FIGS. 7 and 8.

Figure 7:
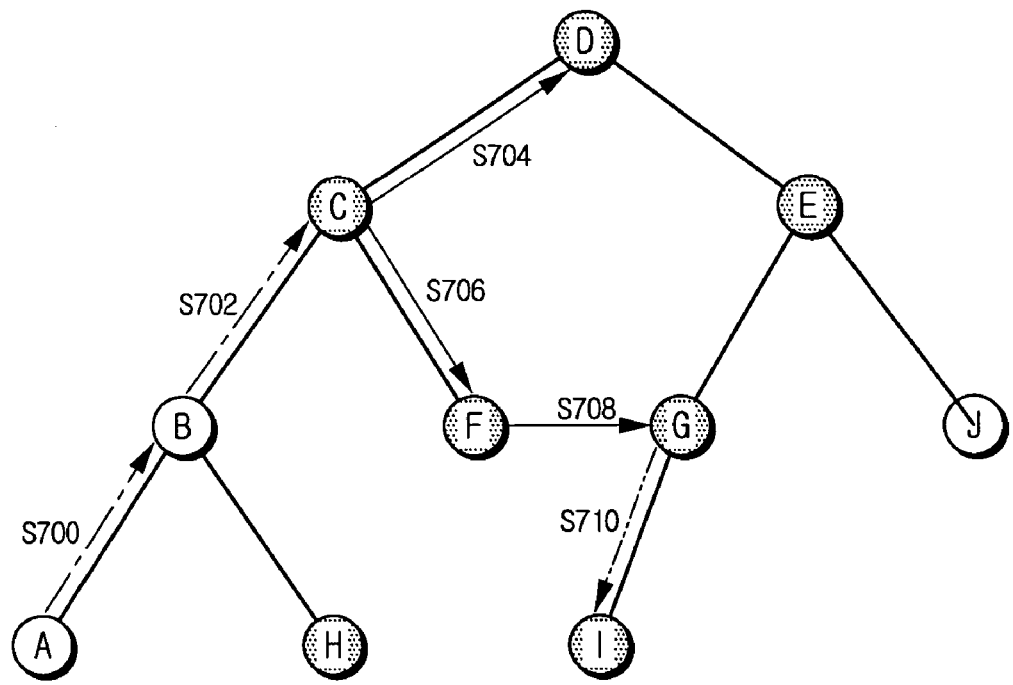
FIG. 7 is a diagram illustrating a drawback according to one embodiment of the present invention.
Figure 7:
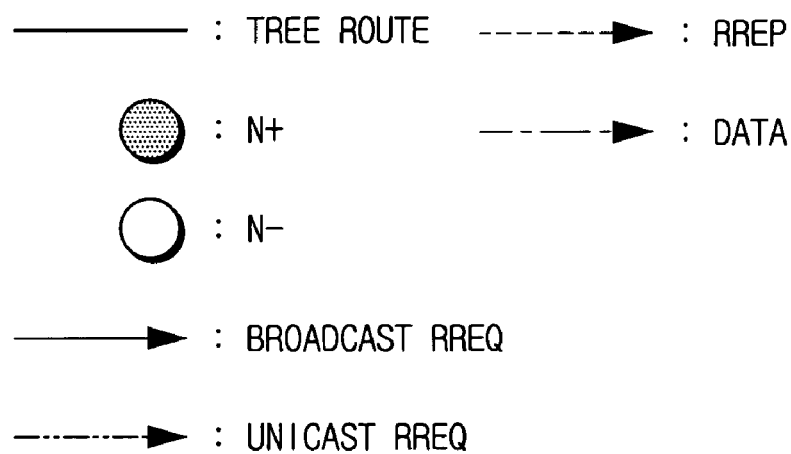

FIG. 7 illustrates a failure of establishing an optimum route when the routing is carried out according to the first exemplary embodiment of the present invention. Let the node A be a source node and the node I be a destination node. The source node A transmits data to the node B at step S700, and the node B relays the data to the node C at step S702. The node C stores the received data into a buffer, and creates and broadcasts a RREQ message at steps S704 and S706. The detailed description of the step S704 is omitted for the sake of conciseness. The node F updates and broadcasts the received RREQ message at step S708. The node G updates and unicasts the received RREQ message to the destination node I by analyzing information on the destination node contained in the RREQ message at step S710. The destination node I forwards a RREP message following the reverse route of the RREQ message. As a result, the route is established along the nodes A→B→C→F→G→I.

This route is not optimal, because the optimum route is a route along the nodes A→H→I.

Figure 8:
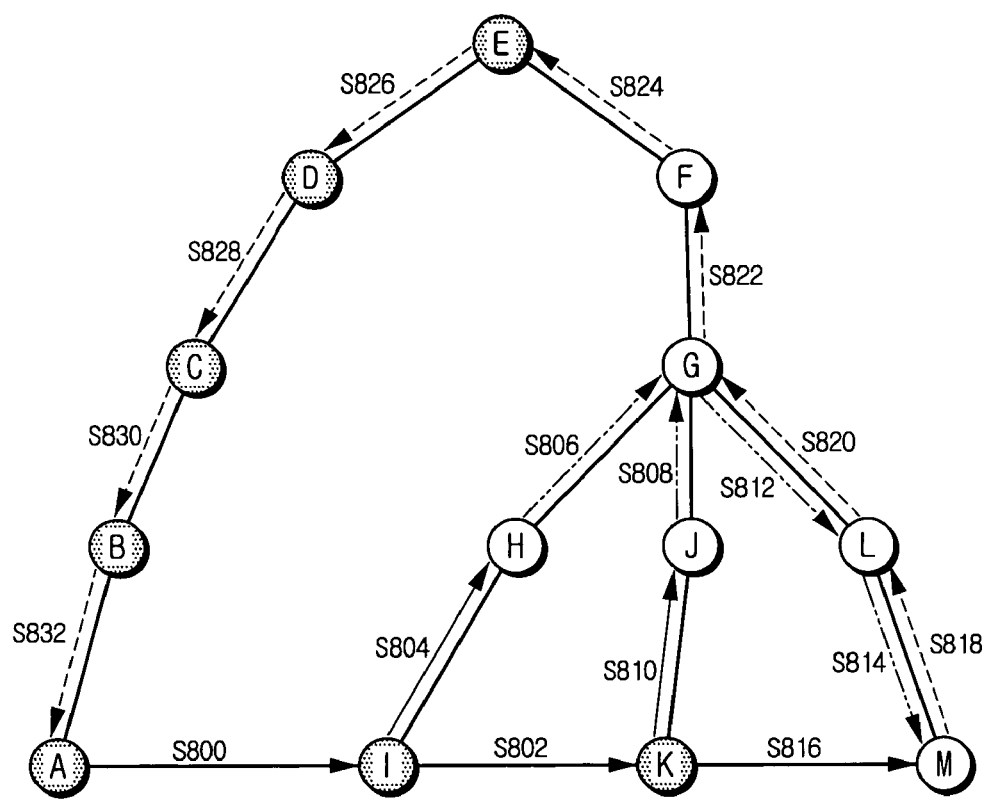
FIG. 8 is a diagram illustrating another drawback according to one embodiment of the present invention.

FIG. 8 illustrates that a backward route is established differently from a forward route according to the first embodiment of the present invention. The forward route denotes a route from a source node to a destination node, and the backward route denotes a route from the destination node to the source node.

Referring to FIG. 8, the source node is the node A and the destination node is the node M. The source node A broadcasts a RREQ message to set up a route to the destination node M at step S800. The node I updates the received RREQ message and broadcasts the updated RREQ message at steps S802 and S804. The node K receives and updates the broadcast RREQ message. The node K broadcasts the updated RREQ message at steps S810 and S816, and the destination node M receives the RREQ message. Detailed descriptions of steps S806, S808, S812, and S814 are omitted for conciseness. Finally, the forward route is established along the nodes A→I→K→M.

Upon receiving the RREQ message, the destination node M, which is an N− node, unicasts a RREP message to the node L at step S818. The N− node L updates and unicasts the received RREP message to the node G at step S820. The N− node G updates and unicasts the received RREP message to the node F at step S822. The RREP message is finally sent to the node A at steps S824, S826, S828, S830, and S832. Consequently, the backward route is established along the nodes M→L→G→F→E→D→C→B→A.

As illustrated, the forward and backward routes are different from each other according to the first embodiment of the present invention. This drawback can be addressed according to the second embodiment of the present invention, which is described in greater detail below.

Second Exemplary Embodiment

According to a second exemplary embodiment of the present invention, a routing table capable of containing a certain information is assigned to a N− node, and a concept of a border node is suggested.

1. N− in the tree

If the N− node is a source node, the N− node stores into a buffer data to be transmitted and spots a location of a destination node. When a destination node is its descendent node, the N− node transmits the data along the tree route without having to search a route. If the destination node is not its descendent node, even the N− creates a routing table for the related destination node and broadcasts a RREQ message.

If the N− node is an intermediate node and receives a unicast RREQ message, the N− node updates and transmits the received RREQ message following the tree route. If the source node of the RREQ message is its descendent node and the N− node receives a broadcast RREQ message from its child node, the N− node updates and transmits the received RREQ message following the tree route.

If the N− node is the destination node, the N− node creates a RREBP message in reply to the received RREQ message, stores an information of a next border node contained in the RREQ message, and transmits the created RREP message. Even the N− creates and maintains a routing tale for a related source node.

2. N+ in the tree

The N+ performs the same processes as aforementioned in the first embodiment of the present invention.

Figure 9:
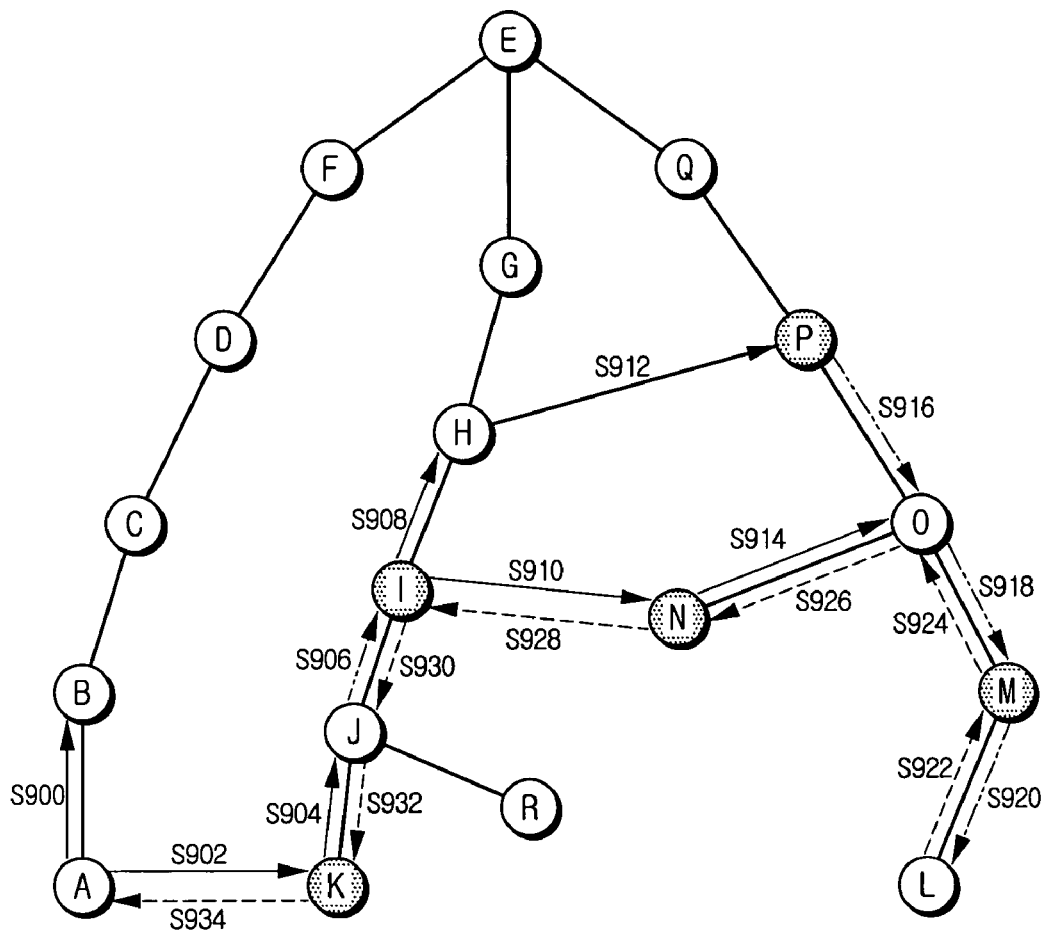
FIG. 9 is a diagram illustrating a route setup according to another embodiment of the present invention.

FIG. 9 illustrates that a forward route is the same as a backward route according to the second exemplary embodiment of the present invention, which is described in greater detail below.

In FIG. 9, a source node is the node A and a destination node is the node L. The source node A knows that the destination node is not its descendent node by analyzing the address of the destination node. The source node A performs the route search to establish a route, and distinguishes from the first embodiment by not transmitting data to the node B. Specifically, the source node A creates a RREQ message and broadcasts the created RREQ message at steps S900 and S902. The detailed description of the RREQ message transmitted from the source node A to the node B is omitted for conciseness. The node K updates and broadcasts the received RREQ message at step S904. As the node K does not receive the RREQ message along the tree route, the node K attaches into the RREQ message an information indicating that itself can be a border node. The border node indicates a node which receives the RREQ message along the route other than the tree route and transmits the updated RREQ message but along the tree route.

The node J receives the broadcast RREQ message from the node K and recognizes that the node K is the border node. Since the node J receives the RREQ message along the tree route, the node J recognizes that the node K is the border node by use of the received RREQ message.

The node J attaches into the RREQ message an information indicating that the node K is the border node. The node J also stores that the node K is the border node. The node J unicasts the updated RREQ message to the node I at step S906. As mentioned in the first embodiment of the present invention, upon receiving the RREQ message from its child node, the N− intermediate node updates and unicasts the received RREQ message. The node I updates and broadcasts the received RREQ message at steps S908 and S910. The node N broadcasts the received RREQ message at step S914. At this time, the node N attaches into the RREQ message that itself can be a border node candidate. Upon receiving the broadcast RREQ message from the node N, the node O recognizes that the node N is the border node. Thus, the node O updates the information on the border node contained in the received RREQ message. The node O stores into its routing table that the node N is the border node. After updating the received RREQ message, the node O unicasts the updated RREQ message to the node M at step S918. The node M updates and unicasts the received RREQ message to the node L at step S920.

The node H updates and broadcasts the received RREQ message at step S912. After receiving the broadcast RREQ message from the node H, the node P unicasts the received RREQ message to the node O at step S916. The node O updates and unicasts the received RREQ message to the node M at step S918. The node M updates and unicasts the received RREQ message to the node L at step S920.

Accordingly, the node L may receive more than two RREQ messages and chooses the RREQ message having the smallest link cost of the two RREQ message. As a result, the forward route is established along the nodes A→K→J→I→N→O→M→L. Albeit not described, each N+ stores into its routing table the information contained in the RREQ message. Hereinafter, a backward routing is described.

The node L stores the information on the next border node contained in the received RREQ message and sends a created RREP message containing the related information to the node M at step S922. The node M updates and forwards the received RREP message at step S924. The node O forwards the RREP message to the node N using the border node information contained in the RREP message at step S926. The node N updates the information on the next border node of the received RREP message with its stored border node (node K) information and forwards the received RREP to the node I at step S928. Finally, the RREP message is forwarded to the node A at steps S930, S932, and S934. As a result, the backward route the same as the forward route is established.

Figure 10:
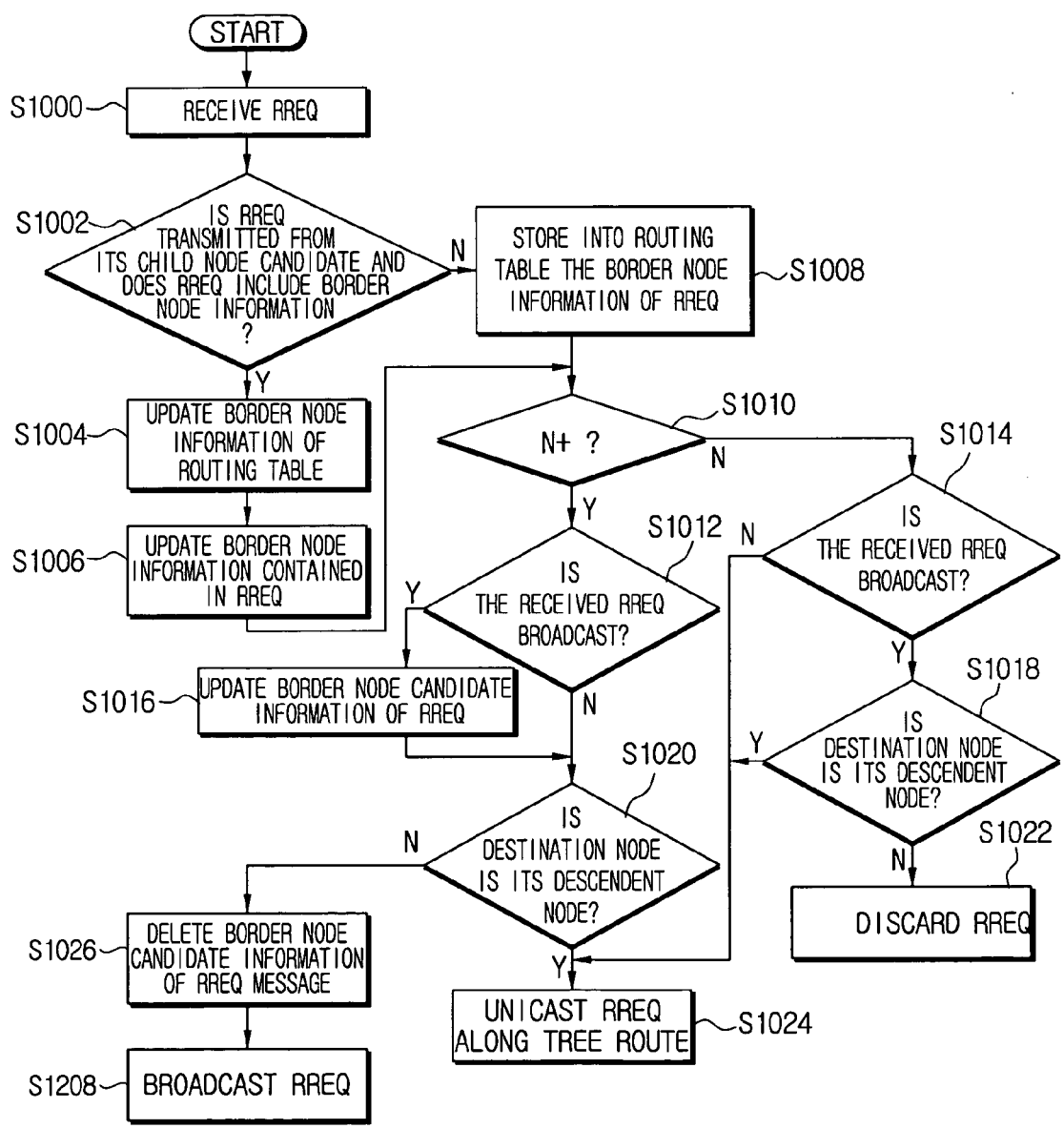
FIG. 10 is a flowchart illustrating exemplary steps of a RREQ-received node according to another embodiment of the present invention.

FIG. 10 is a flowchart illustrating exemplary steps of a RREQ-received node according to another embodiment of the present invention.

A node receives a RREQ message at step S1000. The node determines whether the received RREQ message includes information of a border node candidate and is transmitted from its child node at step S1002.

If so, the node stores into its routing table the border node candidate as the border node at step S1004. The node updates the border node information in the received RREQ message at step S1006. If the RREQ message does not include the border node information and is not transmitted from the child node, the node stores into its routing table the border node information included in the RREQ message at step S1008.

The node determines whether itself is an N+ node at step S1010. If so, the node determines whether the received RREQ message is broadcast at step S1012. If so, the node updates the border node candidate information included in the RREQ message using its own information at step S1016.

Next, the node determines whether a destination node is its descendent node at step S1020. If so, the node unicasts the updated RREQ message following the tree route at step S1024. If not, the node deletes the stored RREQ border node candidate information and broadcasts the updated RREQ message at step S1026.

If the node is the N− node at step S1010, the node determines whether the received RREQ message is broadcast at step S1014. If so, the node determines whether the destination node is its descendent node at step S1018. If so, the node unicasts the updated RREQ message following the tree route at steps S1024. If not, the node discards the received RREQ message at step S1022.

Figure 11:
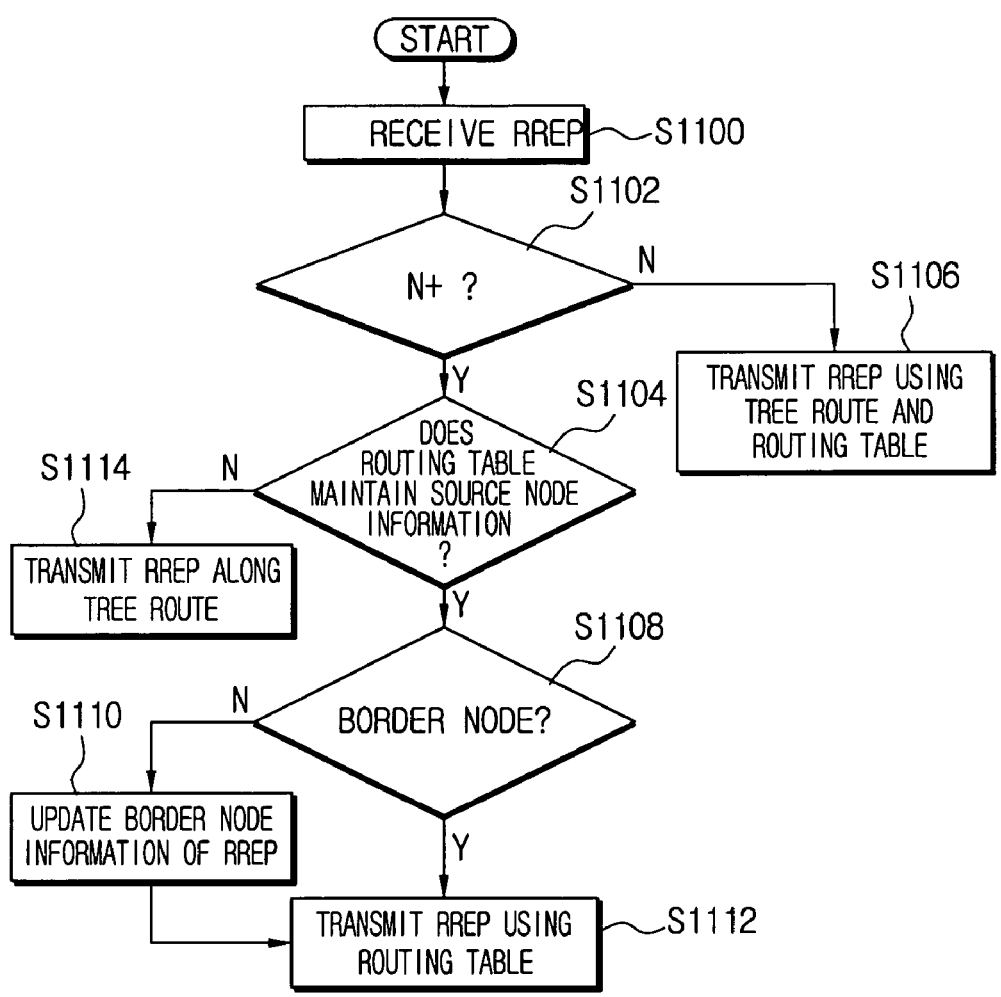
FIG. 11 is a flowchart illustrating exemplary steps of a RREP-received node according to another embodiment of the present invention.

FIG. 11 is a flowchart illustrating exemplary steps of a RREP-received node according to another embodiment of the present invention, which is described in greater detail below.

A node receives a RREP message at step S1100. The node determines whether itself is a N+ at step S1102. If not, the node forwards the received RREP message to a border node by use of the tree route and its routing table at step S1106. If so, the node determines whether the routing table maintains the source node information at step S1104. If not, the node forwards the RREP message following the tree route at step S1114.

If the node maintains the source node information, the node determines whether itself is a border node at step S1108. If not, the node updates the border node information included in the RREP message at step S1110. That is, the node updates the RREP message using the border node information maintained by the node. If so, the node updates the received RREP message using its routing table and forwards the updated RREP message at step S1112.

In light of the foregoing, as the N− stores the minimal information and the stored information is used for the routing, the backward route the same as the forward route can be established. In addition, an optimal or near optimal route is established.

While the embodiments of the present invention have been described, additional variations and modifications of the embodiments may occur to those skilled in the art once they learn of the basic inventive concepts. Therefore, it is intended that the appended claims shall be construed to include both the above exemplary embodiments and all such variations and modifications that fall within the spirit and scope of the invention.

What is claimed is:

1. A method for relaying a route request RREQ message in a wireless communication system comprising a plurality of nodes in which a portion of the nodes form a tree route structure in which routes between nodes of the portion of the nodes are pre-established before establishing a route using RREQ and route reply RREP messages, the plurality of nodes including a destination node, a source node, and at least one intermediate node, the source node sending the RREQ message to the destination node via the at least one intermediate node, the method performed by one intermediate node of the at least one intermediate node and the method comprising:

receiving the RREQ message;
extracting address information of the destination node from the RREQ message;
updating the RREQ message with first information for searching a backward route using stored information when the RREQ message is received along a route other than a route of the tree route structure; and
transmitting the updated RREQ message.

2. The method of claim 1, wherein the received RREQ message is updated and transmitted only when the RREQ message, received along the route other than the route of the tree route structure, is received from a descendent node with respect to the one intermediate node.

3. The method of claim 1, further comprising updating the RREQ message with second information for searching the backward route using the stored information when the RREQ message is received along a route of the tree route structure.

4. The method of claim 3, wherein the second information that is used to update the RREQ message is stored into a routing table.

5. The method of claim 3, wherein the updated RREQ message is unicast when the address information of the destination node contained in the RREQ message indicates the destination node is a descendent node with respect to the one intermediate node.

6. The method of claim 3, further comprising receiving a RREP message sent from the destination node which attaches the second information contained in the RREQ message that is received by the destination node to the RREP message.

7. The method of claim 6, further comprising forwarding the received RREP message to a node corresponding to the second information.

8. The method of claim 7, further comprising updating the received RREP message using the second information stored in a routing table in the one intermediate node prior to forwarding the received RREP message.

9. The method of claim 1, wherein the source node does not send the RREQ message when the destination node is a parent node of the source node or a descendent node of the source node along the tree route structure.

10. The method of claim 9, wherein the source node identifies a location of the destination node according to tree router calculations and forwards data to the identified location.

11. The method of claim 10, further comprising comparing an address of the one intermediate node and the address of the destination node, and relaying data along a route of the tree route structure when the address of the one intermediate node and the address of the destination node are not the same.

12. The method of claim 1, wherein the backward route is from the destination node to the source node.

13. A wireless communication system comprising a plurality of nodes in which a portion of the nodes form a tree route structure in which routes between nodes of the portion of the nodes are pre-established before establishing a route using RREQ and RREP messages, the plurality of nodes comprising:
   a destination node;
   a source node operable to create a route request RREQ message and transmit the created RREQ message to the destination node;
   at least one intermediate node between the source node and the destination node, the at least one intermediate node operable to receive the RREQ message from a preceding node, extract an address of the destination node from the RREQ message, update the received RREQ message with first information for searching a backward route using stored information in the at least one intermediate node when the RREQ message is received along a route other than a route of the tree route structure, and transmit the updated RREQ message.

14. The apparatus of claim 13, wherein the intermediate node updates and transmits the received RREQ message only when the RREQ message is received along the route other than the route of the tree route structure from a descendent node with respect to the at least one intermediate node.

15. The apparatus of claim 13, wherein the intermediate node updates the RREQ message with second information for searching the backward route using the stored information when the RREQ message containing the first information is received along a route of the tree route structure.

16. The apparatus of claim 15, wherein the intermediate node stores the second information that is used to update the RREQ message in a routing table.

17. The apparatus of claim 15, wherein the intermediate node unicasts the updated RREQ message when the address information of the destination node contained in the RREQ message indicates the destination node is the descendent node with respect to the at least one intermediate node.

18. The apparatus of claim 15, wherein the destination node attaches the second information contained in the RREQ message that is received by the destination node into a created route reply RREP message, and transmits the created RREP message.

19. The apparatus of claim 18, wherein the intermediate node receives the RREP message and forwards the received RREP message to a node corresponding to the second information.

20. The apparatus of claim 19, wherein the intermediate node updates the received RREP message using the second information stored in a routing table of the intermediate node prior to forwarding the RREP message.

21. The apparatus of claim 13, wherein the source node does not create the RREQ message when the destination node is a parent node of the source node or a descendent node of the source node along a route of the tree route structure.

22. The apparatus of claim 21, wherein the source node identifies a location of the destination node according to tree router calculations, and forwards data to the identified location.

23. The apparatus of claim 22, wherein the intermediate node compares its address and the extracted address of the destination node, and relays the data along a route of the tree route structure when the address of the intermediate node and the address of the destination node are not the same.

24. The apparatus of claim 13, wherein the backward route is from the destination node to the source node.

25. A method for processing a message, the method comprising:
   receiving a Route REQuest (RREQ) message by a first device within a wireless communication system comprising a plurality of devices in which a portion of the devices form a tree route structure in which routes between devices of the portion of the devices are pre-established before establishing a route using RREQ and RREP messages, the wireless communication system comprising at least the first device and a descendent device of the first device;
   determining by the first device whether the RREQ message is sent from the descendent device of the first device, when the first device does not possess a routing table; and
   in response to determining that the RREQ message is sent from the descendent device, updating the RREQ message with an address of the first device and transmitting the updated RREQ message, otherwise discarding the RREQ message by the first device without transmitting the RREP message in reply to the RREQ message.

26. The method of claim 25, wherein the determining comprises determining by the first device whether the RREQ message is unicast from the descendent device of the first device, when the first device does not possess the routing table.

27. The method of claim 25, further comprising responding by the first device with a Route REPly (RREP) message, when it is determined that a destination of the RREQ message is the first device, or the descendent device of the first device.

28. The method of claim 25, further comprising transmitting by the first device the RREQ message to a second device within the wireless communication system, when the first device does not possess the routing table, and when it is determined that the RREQ message is sent from the descendent device of the first device, and that the destination of the RREQ message is neither the first device, nor the descendent device of the first device.

29. The method of claim 28, wherein the transmitting comprises unicasting the RREQ message by the first device to the second device within the wireless communication system, when the first device does not possess the routing table, and when it is determined that the RREQ message is unicast from the descendent device of the first device, and that the destination of the RREQ message is neither the first device nor the descendent device of the first device.

30. The method of claim 25, further comprising transmitting by the first device received data to a destination using a route of the tree route structure, when it is determined that the destination of the received data is the descendent device of the first device.

31. A method for processing a message, comprising:
   receiving a Route REPly (RREP) message by a first device within a wireless tree-structure network comprising at least the first device;

discarding the RREP message by the first device, when the first device does not possess a routing table and when it is determined that a destination of the RREP message is the first device; and transmitting by the first device the RREP message to a second device, when the first device does not possess a routing table and when it is determined that the destination of the RREP message is not the first device.

* * * * *